(12) United States Patent
Secondini et al.

(10) Patent No.: US 8,611,763 B2
(45) Date of Patent: Dec. 17, 2013

(54) PHASE NOISE COMPENSATION IN COHERENT OPTICAL COMMUNICATIONS SYSTEMS

(75) Inventors: Marco Secondini, Rome (IT); Tommaso Foggi, Parma (IT); Giulio Colavolpe, Parma (IT); Gianluca Meloni, Leghorn (IT); Luca Poti, Pisa (IT); Enrico Forestieri, Parma (IT)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 92 days.

(21) Appl. No.: 12/994,402

(22) PCT Filed: Sep. 2, 2010

(86) PCT No.: PCT/EP2010/062866
§ 371 (c)(1),
(2), (4) Date: Oct. 12, 2011

(87) PCT Pub. No.: WO2012/013250
PCT Pub. Date: Feb. 2, 2012

(65) Prior Publication Data
US 2012/0027404 A1 Feb. 2, 2012

(30) Foreign Application Priority Data
Jul. 29, 2010 (EP) .................................... 10171271

(51) Int. Cl.
*H04B 10/06* (2011.01)

(52) U.S. Cl.
USPC ........... 398/208; 398/202; 398/209; 398/158; 398/159; 398/183; 398/188; 398/204; 398/206; 398/207; 398/192; 398/193; 398/194

(58) Field of Classification Search
USPC ......... 398/202, 204, 205, 206, 207, 208, 209, 398/210, 212, 213, 214, 183, 188, 192, 193, 398/195, 196, 197, 198, 158, 159, 33, 38, 398/25, 26, 27
See application file for complete search history.

(56) References Cited

U.S. PATENT DOCUMENTS

2008/0205905 A1* 8/2008 Tao et al. ...................... 398/204
2011/0305464 A1* 12/2011 Goldfarb ....................... 398/208

OTHER PUBLICATIONS

Colavolpe et al, "Robust Multilevel Coherent Optical Systems with Linear Processing at the Receiver," J. Lightwave Tech., vol. 27, No. 13, pp. 2357-2369, Jul. 1, 2009.

* cited by examiner

*Primary Examiner* — Hanh Phan
(74) *Attorney, Agent, or Firm* — Nixon & Vanderhye, P.C.

(57) ABSTRACT

A method (10) of compensating phase noise in a coherent optical communications network. The method comprises: receiving a traffic sample (12); receiving an optical carrier and determining a phase noise estimate for the optical carrier (14); and removing the phase noise estimate from the traffic sample to form a phase noise compensated traffic sample (16).

9 Claims, 8 Drawing Sheets

PHASE NOISE COMPENSATION IN COHERENT OPTICAL COMMUNICATIONS SYSTEMS

This application is the U.S. national phase of International Application No. PCT/EP2010/062866, filed 2 Sep. 2010, which designated the U.S. and claims priority to European application No. 10171271.7, filed 29 Jul. 2010, which are hereby incorporated by reference.

TECHNICAL FIELD

The invention relates to a method of compensating phase noise in a coherent optical communications network. The invention further relates to a coherent optical receiver, an optical transmitter and an optical communications network.

BACKGROUND

In recent years, coherent optical systems have come back into interest for the upgrade of transmission links for transmission at bit rates of towards 100 Gbps. As bit rates of 100 Gbps have been demonstrated, research activity is now focusing on the next advancement, to hit rates of 400 Gbps or even 1 Tbps. In the light of such an upgrade, moving from standard single-carrier (SC) transmission schemes to alternative schemes, such as orthogonal frequency division multiplexing (OFDM) has been proposed, since the alternatives may enable easier scaling to higher bit rates. One of the most severe impairment that affects coherent systems employing high-order modulation formats is the presence of phase noise introduced by both transmit and receive lasers.

Laser phase noise is due to the instabilities of optical light sources, whose linewidth can vary from a few hundreds kHz to a few MHz, and it can prevent correct detection of transmitted data. Countermeasures to reduce the sensitivity to phase noise of SC coherent systems with inline dispersion compensation have been proposed in G. Colavolpe et al, "*J. Lightwave Tech.*, vol 27, no. 13, pp 2357-2369, 1 Jul. 2009. In OFDM systems, the effect of phase noise is even more severe and represents a major comparison aspect between OFDM and SC.

The impact of phase noise depends on the laser linewidth, the transmission bit-rate, the modulation format, and on the presence of a strategy to combat phase noise. In addition, for long-memory channels (such as dispersion-uncompensated fiber-optic links), the impact of phase noise also depends on the memory length. In the presence of very limited chromatic dispersion, as in links with inline dispersion compensation, in practice an equivalent phase noise, given by the sum of transmit and receive phase noise, is observed at the receiver. In this case, an SC scheme which employs asynchronous strategies for detection and for the adjustment of the equalizer taps described by G. Colavolpe et al exhibits a very good robustness to phase noise. An OFDM system, provided that short OFDM symbols are employed, exhibits a limited performance degradation for lasers' linewidths of practical interest. When larger OFDM symbols are employed a possible solution to improve the robustness against phase noise is the use of a pilot-tone based compensation method.

SUMMARY

It is an object to provide an improved method of compensating phase noise in a coherent optical communications network. It is a further object to provide an improved coherent optical receiver. It is a further object to provide an improved optical transmitter. It is a further object to provide an improved optical communications network.

A first aspect of the invention provides a method of compensating phase noise in a coherent optical communications network. The method comprises receiving a traffic sample. The method further comprises receiving an optical carrier and determining a phase noise estimate for the optical carrier. The phase noise estimate is removed from the traffic sample to form a phase noise compensated traffic sample.

The method may therefore be used to reduce the effects of receive phase noise. Reducing the effect of receive phase noise in an SC coherent transmission system may enable an equalizer in the system, which compensates for group velocity dispersion, to reverse intersymbol interference due to the combined effects of transmit phase noise and channel filtering.

In an embodiment, the method comprises receiving a traffic carrying signal at a coherent optical receiver. The method further comprises receiving a first optical carrier and power splitting the first optical carrier into a first part and a second part. The first part is delivered to the coherent optical receiver to generate a received traffic sample from the traffic carrying signal. The second part of the first optical carrier is interrogated to determine a phase noise estimate for the first optical signal. The method further comprises removing the phase noise estimate from the received traffic sample to form a phase noise compensated received traffic sample. The method may thus enable inexpensive lasers which could not otherwise be used due to the amount of phase noise which they generate to be employed as local oscillators within coherent optical receivers. The method may enable a coherent optical receiver to operate as if a local oscillator with a higher optical coherence were being used.

In an embodiment, the method comprises receiving a traffic sample to be transmitted. The method further comprises receiving a second optical carrier. The second optical carrier is interrogated to determine a phase noise estimate for the second optical carrier. The method further comprises removing the phase noise estimate from the traffic sample to be transmitted to form a phase noise compensated traffic sample for transmission on the second optical carrier. The method may thus enable inexpensive lasers which could not otherwise be used due to the amount of phase noise which they generate to be to employed to generate optical carrier signals for transmitting traffic samples within a coherent optical communications network. The method may enable an optical transmitter to operate as if it were generating an optical carrier signal having a higher optical coherence.

Reducing both the receive and the transmit phase noise enables the method to be applied in an OFDM coherent transmission system.

In an embodiment, the estimate of the phase noise is determined by measuring phase variations of the optical carrier and integrating the measured phase variations.

In an embodiment, the estimate of the phase noise depends on a sampling interval, $T_c$, the time interval, $\tau$, across which the phase variation is measured, and the measured phase variation.

In an embodiment, the estimate of the phase noise, $\hat{\theta}_k$, of the optical carrier at a time, k, is determined from $$\hat{\theta}_k = \hat{\theta}_{k-1} + \frac{T_c}{\tau} z'_k \cdot T_c$$

is the sampling time, $z'_k = z_k - \overline{z_k}$, where $z_k = \angle y_k$ is the phase of the sample $y_k$ and $\overline{z_k}$ the average value of $z_k$. $\hat{\theta}_{k-1}$ is an estimate of the phase noise at an earlier time, k−1. $z'_k$ is substantially equal to the phase noise variation plus a Gaussian noise contribution added during measurement.

A second aspect of the invention provides a coherent optical receiver comprising a coherent optical detector, phase noise estimation apparatus, and a mixer. The coherent optical detector is arranged to receive a traffic carrying signal and to receive a first part of an optical carrier. The coherent optical detector is further arranged to generate a received traffic sample. The phase noise estimation apparatus is arranged to receive a second part of the optical carrier and to generate an estimate of the phase noise of the optical carrier. The mixer is arranged to receive the received traffic sample and the estimate of the phase noise. The mixer is arranged to mix the received traffic sample and the estimate of the phase noise to remove the phase noise estimate from the received traffic sample. A phase noise compensated received traffic sample is thereby formed.

The receiver may therefore reduce the effects of receive phase noise. Using the receiver in an SC coherent transmission system may enable an equalizer in the system, which compensates for group velocity dispersion, to reverse intersymbol interference due to the combined effects of transmit phase noise and channel filtering.

The receiver may allow an inexpensive laser which could not otherwise be used due to the amount of phase noise which they generate to be employed as a local oscillator to generate the optical carrier. The receiver may thus operate as if a local oscillator with a higher optical coherence were being used.

In an embodiment, the phase noise estimation apparatus comprises phase measurement apparatus, sampling apparatus and a phase estimator. The phase measurement apparatus is arranged to generate a phase measurement signal. The sampling apparatus is arranged to sample the phase measurement signal at a sampling period, $T_c$, to generate phase noise measurements. The phase estimator is arranged to receive the phase noise measurements and to integrate the phase noise measurements to generate a phase noise estimate.

In an embodiment, the phase measurement apparatus comprises one of: a 90 degree optical hybrid and first and second photodetectors; and an optical filter having a substantially linearly varying transfer function at a carrier frequency of the optical carrier and a photodetector.

In an embodiment, the phase noise estimator is arranged to generate a phase noise estimate which depends on the sampling interval, $T_c$, a time interval, $\tau$, across which the phase variation is measured, and the measured phase variation.

In an embodiment, the phase noise estimator is arranged to generate a phase noise estimate, $\hat{\theta}_k$, of the optical carrier at a time, k, from $$\hat{\theta}_k = \hat{\theta}_{k-1} + \frac{T_c}{\tau} z'_k \cdot T_c$$

is the sampling time, $z'_k = z_k - \overline{z_k}$, where $z_k = \angle y_k$ is the phase of the sample $y_k$ and $\overline{z_k}$ the average value of $z_k$. $\hat{\theta}_{k-1}$ is an estimate of the phase noise at an earlier time, k−1. $z'_k$ is substantially equal to the phase noise variation plus a Gaussian noise contribution added during measurement.

A third aspect of the invention provides an optical transmitter comprising phase noise estimation apparatus, a mixer and an optical modulator. The phase noise estimation apparatus is arranged to receive a first part of an optical carrier and to generate an estimate of the phase noise of the optical carrier. The mixer is arranged to receive a traffic sample to be transmitted and the estimate of the phase noise. The mixer is further arranged to mix the traffic sample to be transmitted and the estimate of the phase noise to remove the phase to noise estimate from the traffic sample. A phase noise compensated traffic sample for transmission is thereby formed. The optical modulator is arranged to receive a second part of the optical carrier and the phase noise compensated traffic sample. The optical modulator is further arranged to apply the phase noise compensated traffic sample to the second part of the optical carrier.

The transmitter may thus be used with inexpensive lasers which could not otherwise be used due to the amount of phase noise which they generate to generate the optical carrier. The optical transmitter may thus operate as if it were using an optical carrier signal having a higher optical coherence.

In an embodiment, the phase noise estimation apparatus comprises phase measurement apparatus, sampling apparatus and a phase estimator. The phase measurement apparatus is arranged to generate a phase measurement signal. The sampling apparatus is arranged to sample the phase measurement signal at a sampling period, $T_c$ to generate phase noise measurements. The phase estimator is arranged to receive the phase noise measurements and to integrate the phase noise measurements to generate a phase noise estimate.

In an embodiment, the phase measurement apparatus comprises one of: a 90 degree optical hybrid and first and second photodetectors; and an optical filter having a substantially linearly varying transfer function at a carrier frequency of the optical carrier and a photodetector.

In an embodiment, the phase noise estimator is arranged to generate a phase noise estimate which depends on the sampling interval, $T_c$, a time interval, $\tau$, across which the phase variation is measured, and the measured phase variation.

In an embodiment, the phase noise estimator is arranged to generate a phase noise estimate, $\hat{\theta}_k$, of the optical carrier at a time, k, from $$\hat{\theta}_k = \hat{\theta}_{k-1} + \frac{T_c}{\tau} z'_k \cdot T_c$$

is the sampling time, $z'_k = z_k - \overline{z_k}$, where $z_k = \angle y_k$ is the phase of the sample $y_k$ and $\overline{z_k}$ the average value of $z_k$. $\hat{\theta}_{k-1}$ is an estimate of the phase noise at an earlier time, k−1. $z'_k$ is substantially equal to the phase noise variation plus a Gaussian noise contribution added during measurement.

A fourth aspect of the invention provides a coherent optical communications network comprising an optical link and a coherent optical receiver coupled to a first end of the optical link. The coherent optical receiver is as described in any of the paragraphs above.

The coherent optical receiver may reduce the effects of receive phase noise in the network. Using the coherent optical receiver in the network may enable an equalizer in the system, which compensates for group velocity dispersion, to reverse intersymbol interference due to the combined effects of transmit phase noise and channel filtering for SC transmission.

In an embodiment, the network further comprises an optical transmitter coupled to a second end of the optical link. The optical transmitter is as described in any of the paragraphs above.

Using both the coherent optical receiver and the optical transmitter in the coherent transmission system may enable an equalizer in the system, which compensates for group velocity dispersion, to reverse intersymbol interference due to the combined effects of transmit phase noise and channel filtering for OFDM transmission.

A fifth aspect of the invention provides an optical communications network element comprising at least one of a coherent optical receiver and an optical transmitter. The coherent optical receiver is as described in any of the paragraphs above. The optical transmitter is as described in any of the paragraphs above.

Providing a coherent optical receiver may reduce the effects of receive phase noise at the network element. Providing a coherent optical receiver in the network element may enable an equalizer arranged to receive an output of the receiver, which compensates for group velocity dispersion, to reverse intersymbol interference due to the combined effects of transmit phase noise and channel filtering for SC transmission. Providing both a coherent optical receiver and a optical transmitter in the network element may enable an equalizer arranged to receive an output of the receiver, which compensates for group velocity dispersion, to reverse intersymbol interference due to the combined effects of transmit phase noise and channel filtering for OFDM transmission.

A sixth aspect of the invention provides a data carrier having computer readable instructions embodied therein. The said computer readable instructions are for providing access to resources available on a processor. The computer readable instructions comprise instructions to cause the processor to perform any of the above steps of the method of compensating phase noise in a coherent optical communications network.

DETAILED DESCRIPTION

Figure 1:
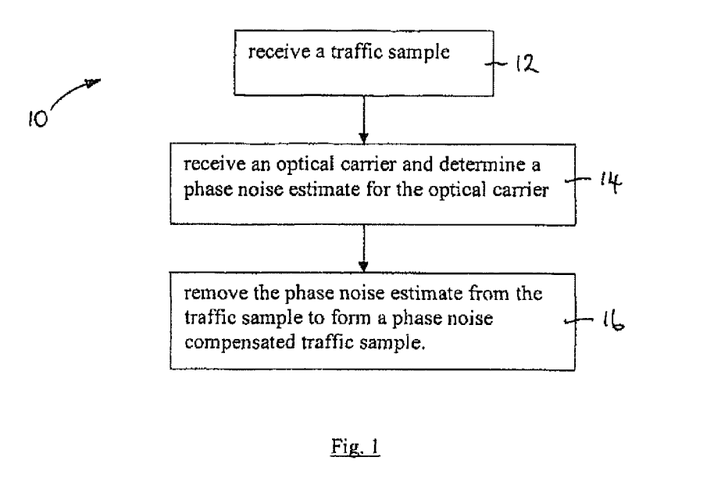
FIG. 1 shows the steps of a method of compensating phase noise in a coherent optical communications network according to a first embodiment of the invention.

Referring to FIG. 1, a first embodiment of the invention provides a method 10 of compensating phase noise in a coherent optical communications network. The method 10 comprises:

receiving a traffic sample 12;

receiving an optical carrier and determining a phase noise estimate for the optical carrier 14; and removing the phase noise estimate from the traffic sample to form a phase noise compensated traffic sample 16.

Figure 2:
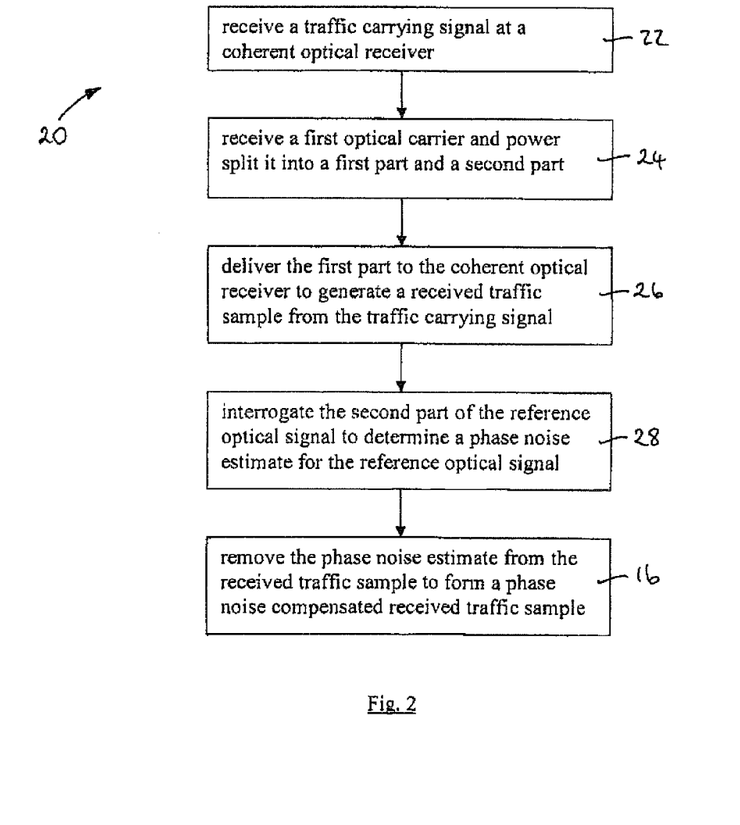
FIG. 2 shows the steps of a method of compensating phase noise in a coherent optical communications network according to a second embodiment of the invention.

A second embodiment of the invention provides a method 20 of compensating phase noise in a coherent optical communications network. The steps of the method 20 of this embodiment are shown in FIG. 2.

The method 20 of this embodiment is for use at a coherent optical receiver and comprises:

receiving a traffic carrying signal at a coherent optical receiver 22;

receiving a first optical carrier and power splitting the first optical carrier into a first part and a second part 24;

delivering the first part of the first optical carrier to the coherent optical receiver to generate a received traffic sample from the traffic carrying signal 26;

interrogating the second part of the first optical carrier to determine a phase noise estimate for the first optical signal 28; and removing the phase noise estimate from the received traffic sample to form a phase noise compensated received traffic sample 16.

The method 20 may enable the coherent optical receiver to operate as if the first optical carrier were generated by a local oscillator with a higher optical coherence. This may enable inexpensive lasers which could not otherwise be used due to the amount of phase noise which they generate to be employed as local oscillators within coherent optical receivers.

The method 20 may be used to reduce the effects of receive phase noise and doing this in an SC coherent transmission system may enable an equalizer in the system, which compensates for group velocity dispersion, to reverse intersymbol interference due to the combined effects of transmit phase noise and channel filtering.

Figure 3:
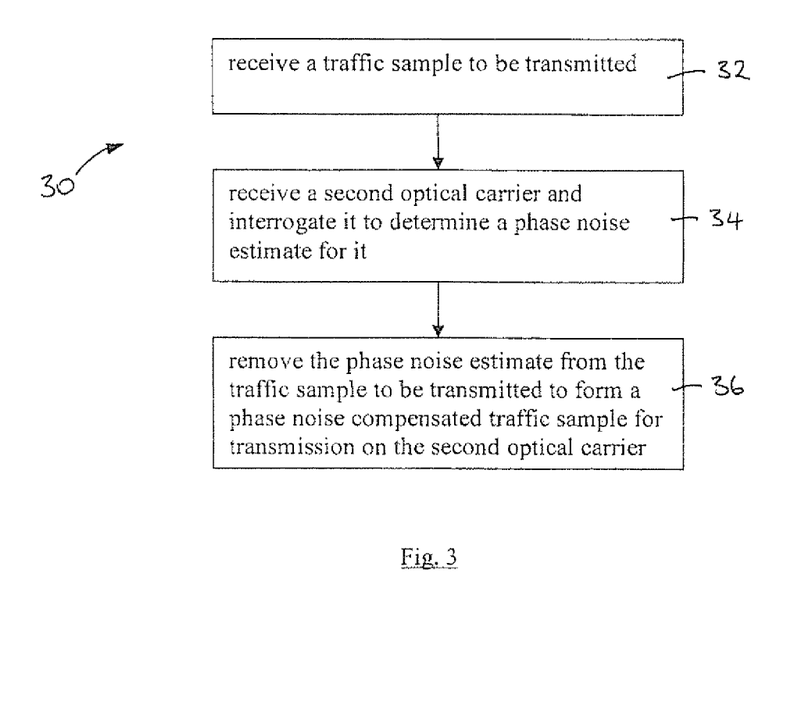
FIG. 3 shows the steps of a method of compensating phase noise in a coherent optical communications network according to a third embodiment of the invention.

FIG. 3 shows the steps of a method 30 of compensating phase noise in a coherent optical communications network according to a third embodiment of the invention. The method 30 of this embodiment is for use at an optical transmitter in a coherent optical communications network. The method 30 comprises:

receiving a traffic sample to be transmitted 32;

receiving a second optical carrier and interrogating the second optical carrier to determine a phase noise estimate for the second optical carrier 34; and removing the phase noise estimate from the traffic sample to be transmitted to form a phase noise compensated traffic sample for transmission on the second optical carrier 36.

The method 30 may be used to reduce the effect of transmit phase noise, enabling an optical transmitter to operate as if it were using an optical carrier signal having a higher optical coherence. This enable inexpensive lasers which could not otherwise be used due to the amount of phase noise which they generate to be employed to generate optical carrier signals for transmitting traffic samples within a coherent optical communications network.

Figure 4:
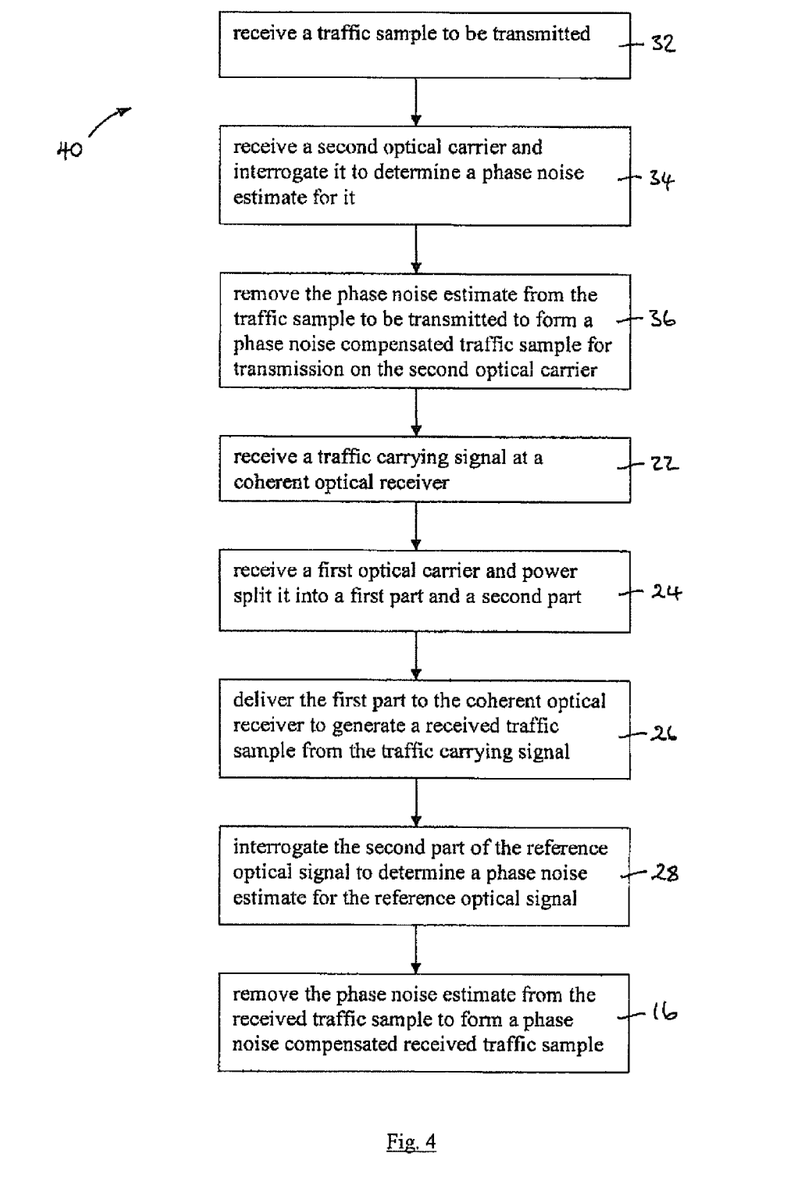
FIG. 4 shows the steps of a method of compensating phase noise in a coherent optical communications network according to a fourth embodiment of the invention.

A fourth embodiment of the invention provides a method 40 of compensating phase noise in a coherent optical communications network. The steps of the method 40 of this embodiment are shown in FIG. 4.

The method 40 of this embodiment is for use at the optical transmitter and the coherent optical receiver at either end of an optical link in a coherent optical communications network and is based on the steps of the methods 20, 30 of FIGS. 2 and 3. The method 40 comprises:

receiving a traffic sample to be transmitted 32;

receiving a second optical carrier and interrogating the second optical carrier to determine a phase noise estimate for the second optical carrier 34;

removing the phase noise estimate from the traffic sample to be transmitted to form a phase noise compensated traffic sample for transmission on the second optical carrier 36;

receiving a traffic carrying signal at a coherent optical receiver 22;

receiving a first optical carrier and power splitting the first optical carrier into a first part and a second part 24;

delivering the first part of the first optical carrier to the coherent optical receiver to generate a received traffic sample from the traffic carrying signal 26;

interrogating the second part of the first optical carrier to determine a phase noise estimate for the first optical signal 28; and removing the phase noise estimate from the received traffic sample to form a phase noise compensated received traffic sample 16.

The method 40 may be used to reduce the effects of both transmit and receive phase noise and doing this in an OFDM coherent transmission system may enable an equalizer in the system, which compensates for group velocity dispersion, to reverse intersymbol interference due to the combined effects of transmit phase noise and channel filtering.

Figure 5:
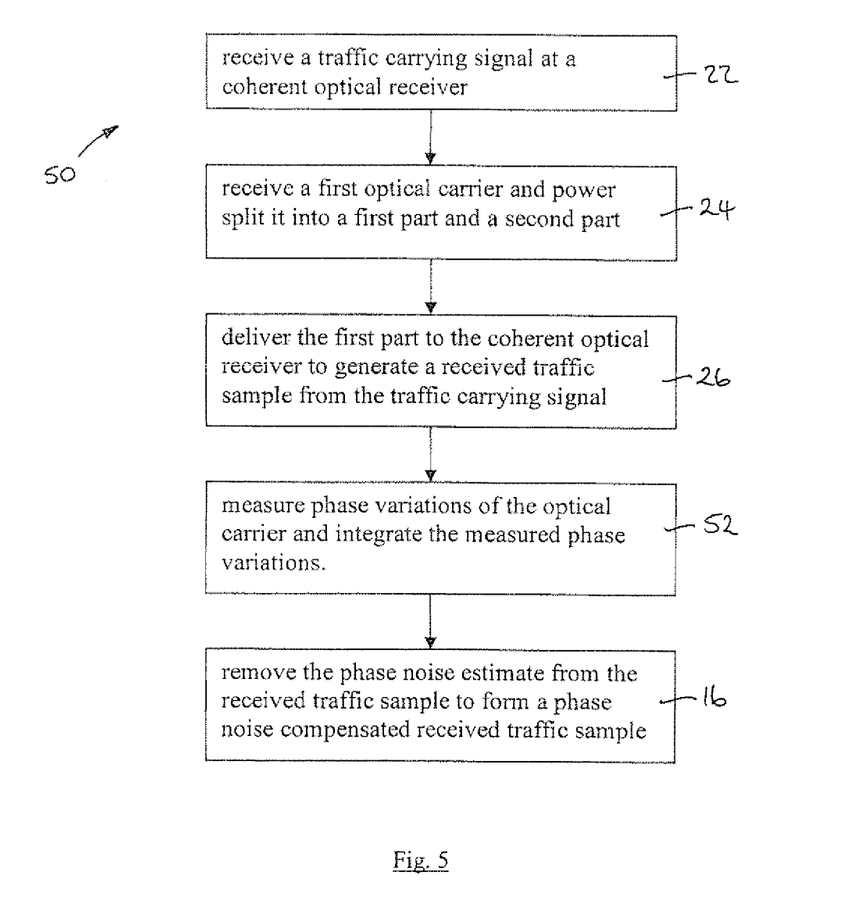
FIG. 5 shows the steps of a method of compensating phase noise in a coherent optical communications network according to a fifth embodiment of the invention.

A fifth embodiment of the invention provides a method 50 of compensating phase noise in a coherent optical communications network. The steps of the method 50 of this embodiment are shown in FIG. 5.

The steps of the method 50 of this embodiment are substantially the same as the steps of the method 20 of FIG. 2, with the following modifications. The same reference numbers are retained for corresponding steps.

In this embodiment, the estimate of the phase noise is determined by measuring phase variations of the optical carrier and integrating the measured phase variations 52.

Figure 6:
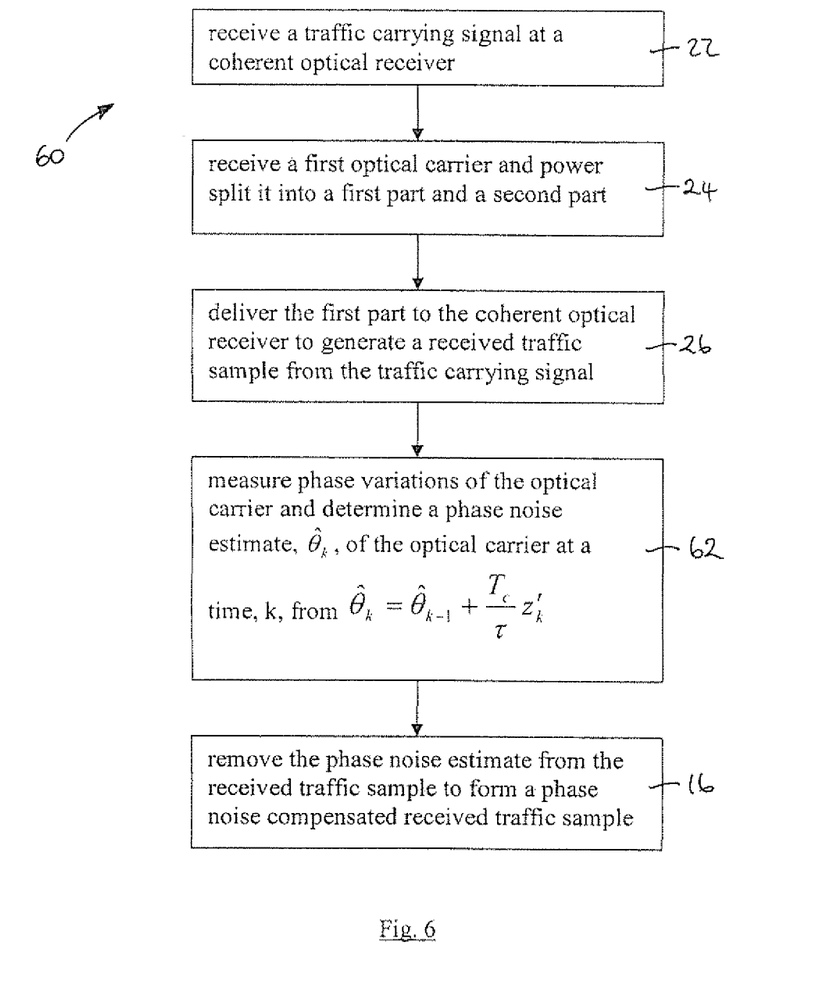
FIG. 6 shows the steps of a method of compensating phase noise in a coherent optical communications network according to a sixth embodiment of the invention.

A sixth embodiment of the invention provides a method 60 of compensating phase noise in a coherent optical communications network. The steps of the method 60 of this embodiment are shown in FIG. 6.

The steps of the method 60 of this embodiment are substantially the same as the steps of the method 20 of FIG. 2, with the following modifications. The same reference numbers are retained for corresponding steps.

In this embodiment, the estimate of the phase noise depends on a sampling interval, $T_c$, the time interval, $\tau$, across which the phase variation is measured, and the measured phase variation.

The phase noise variations of the optical carrier are measured and an estimate of the phase noise, $\hat{\theta}_k$, of the optical carrier at a time, k, is determined from:

$$\hat{\theta}_k = \hat{\theta}_{k-1} + \frac{T_c}{\tau} z'_k.$$

where $T_c$ is the sampling time, $z'_k = z_k - \overline{z_k}$, $z_k = \angle y_k$ is the phase of the sample $y_k$ and $\overline{z_k}$ the average value of $z_k$, $\hat{\theta}_{k-1}$ is an estimate of the phase noise at an earlier time, k−1, and $z'_k$ is substantially equal to the phase noise variation plus some Gaussian noise contribution added during measurement.

Since the phase estimate, $\hat{\theta}_k$, is obtained by integrating the measured phase variations, a slowly increasing deviation from the actual phase of the optical carrier is introduced due to error accumulation, resulting in a residual phase noise. This deviation can be practically approximated as a Wiener-like process, thus resembling the phase noise of an equivalent local oscillator with a narrower linewidth. The rate of deviation becomes faster with decreasing $\tau$. Phase variations on time scales shorter than $\tau$ are not compensated by the method. Therefore, the choice of the time interval, $\tau$, across which the phase variations are measured must be traded off with minimizing the residual phase noise.

Figure 7:
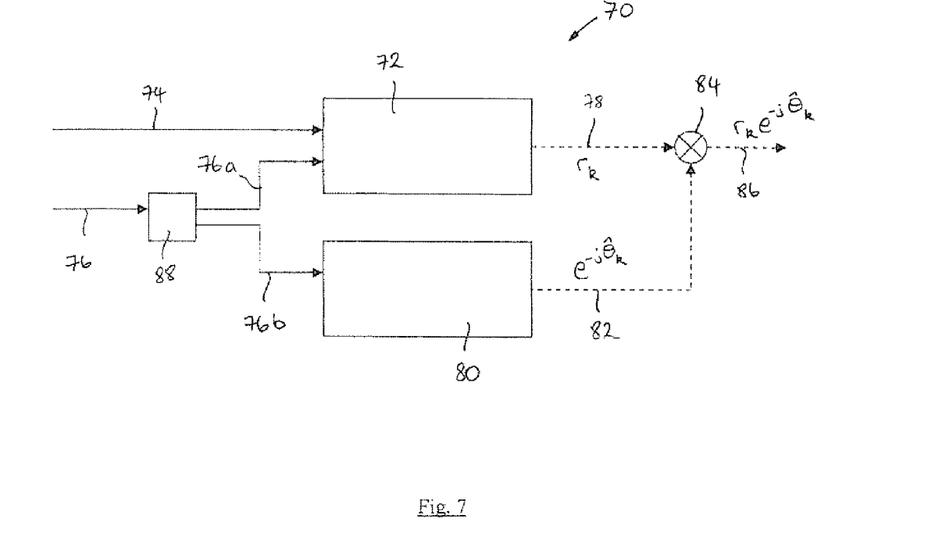
FIG. 7 is schematic representation of a coherent optical receiver according to a seventh embodiment of the invention.

A seventh embodiment of the invention provides a coherent optical receiver 70, as shown in FIG. 7. The coherent optical receiver 70 comprises a coherent optical detector 72, phase noise estimation apparatus 80 and a mixer 84.

The coherent optical detector 72 is arranged to receive a traffic carrying signal 74. The coherent optical receiver 70 is arranged to receive an optical carrier 76 and comprises a beam splitter 88 arranged to split the optical carrier into a first part 76a and a second part 76b. The coherent optical detector 72 is arranged to receive the first part of the optical carrier 76a and to use the first part 76a to coherently detect the traffic carrying signal 74 to generate a received traffic sample and to transmit a received traffic sample carrying signal ($r_k$) 78.

The phase noise estimation apparatus 80 is arranged to receive the second part of the optical carrier 76b and to generate an estimate of the phase noise, $\hat{\theta}_k$, of the optical carrier. The phase noise estimate is transmitted as a phase noise estimate signal, $e^{-j\hat{\theta}_k}$, 82.

The mixer 84 is arranged to receive the received traffic sample carrying signal 78 and the phase noise estimate signal 82 and to mix the signals to remove the phase noise estimate from the received traffic sample. The mixer 84 thereby forms a phase noise compensated received traffic sample, $r_k e^{-j\hat{\theta}_k}$ 86.

$r_k$ denotes a vector in which samples of the received traffic signal, are stored. The received traffic signal is sampled at a sampling interval, $T_c$, with samples being collected at times $kT_c$.

Figure 8:
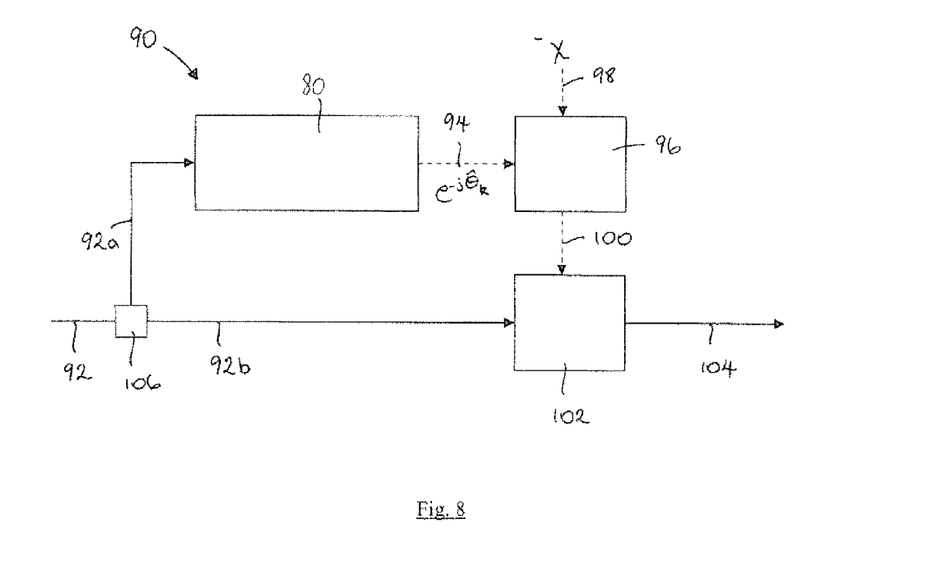
FIG. 8 is a schematic representation of an optical transmitter according to an eighth embodiment of the invention.

FIG. 8 shows an optical transmitter 90 according to an eighth embodiment of the invention. The optical transmitter 90 comprises phase noise estimation apparatus 80, a mixer 96 and an optical modulator 102.

The optical transmitter 90 is arranged to receive an optical carrier 92 and comprises a beam splitter 106 arranged to split the optical carrier into a first part 92a and a second part 92b. The phase noise estimation apparatus 80 is arranged to receive the first part of the optical carrier 92a and to generate an estimate of the phase noise of the optical carrier. The phase noise estimate is transmitted as a phase noise estimate signal, $e^{-j\hat{\theta}_k}$ 94. The mixer is arranged to receive a traffic sample, $\bar{\chi}$, 98 to be transmitted and to receive the phase noise estimate signal 94. The mixer 96 is arranged to mix the traffic sample 98 and the phase noise estimate signal 94, to remove the phase noise estimate from the traffic sample to form a phase noise compensated traffic sample, $\bar{\chi} e^{-j\hat{\theta}_k}$, 100 for transmission.

The second part of the optical carrier 92b forms the optical carrier for carrying traffic for transmission and is received by the optical modulator 102. The optical modulator also receives the phase noise compensated traffic samples 100 and modulates the second part of the optical carrier 92b with the traffic samples 100 to form a traffic carrying signal 104.

Figure 9:
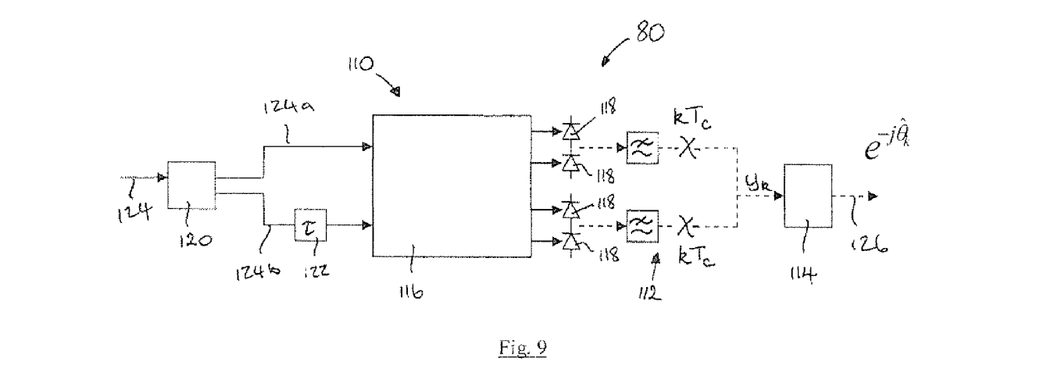
FIG. 9 is a schematic representation of phase noise estimation apparatus for use in a coherent optical receiver or an optical transmitter according to a ninth embodiment of the invention.

FIG. 9 shows a phase noise estimation apparatus 80 for use in a coherent optical receiver 70 or the optical transmitter 90 according to a ninth embodiment of the invention, as shown in FIGS. 7 and 8. The phase noise estimation apparatus 80 is arranged to measure the phase variations of a respective optical carrier 124 on a time interval, $\tau$. The measured phase variations are integrated to obtain an estimate of the phase of the optical carrier 124.

In detail, the phase noise estimation apparatus 80 is arranged to receive an optical carrier 124 and comprises an optical beam splitter 120 arranged to split the optical carrier into first and second parts 124a, 124b. The phase noise estimation apparatus 80 comprises phase measurement apparatus 110, which in this example comprises a 90° optical hybrid 116 and two balanced photodetectors 118. The 90° optical hybrid 116 is arranged to receive first and second parts 124a, 124b of the optical carrier, the second part of the optical carrier 124b being transmitted to the 90° optical hybrid 116 via a delay line 122 arranged to apply a delay, $\tau$, being the time interval across which the phase variation is to be measured.

The phase noise estimation apparatus 80 further comprises sampling apparatus 112 arranged to sample the phase measurement signal, being the output of the balanced photodetectors 118, at a sampling period $T_c$, to generate phase noise estimates $y_k$.

The phase noise estimation apparatus 80 further comprises a phase estimator 114 arranged to receive the phase noise measurements $y_k$ and to integrate them to generate a phase noise estimate, $\hat{\theta}_k$. The phase noise estimate is transmitted as a phase noise estimate signal, $e^{-j\hat{\theta}_k}$, 126.

The estimate of the phase noise depends on a sampling interval, $T_c$, the time interval, $\tau$, across which the phase variation is measured, and the measured phase variation.

The phase noise estimation apparatus measures the phase noise variations of the optical carrier 124 and the estimate of the phase noise, $\hat{\theta}_k$, of the optical carrier at a time, k, is determined from $$\hat{\theta}_k = \hat{\theta}_{k-1} + \frac{T_c}{\tau} z'_k.$$

where $T_c$ is the sampling time, $z'_k = z_k - \overline{z}_k$, $z_k = \angle y_k$ is the phase of the sample $y_k$ and $\overline{z}_k$ the average value of $z_k$, $\hat{\theta}_{k-1}$ is an estimate of the phase noise at an earlier time, k−1, and $z'_k$ is substantially equal to the phase noise variation plus some Gaussian noise added during photodetection.

Since the phase noise estimate, $\hat{\theta}_k$, is obtained by integrating the measured phase variations, a slowly increasing deviation from the actual phase of the optical carrier is introduced due to error accumulation, resulting in a residual phase noise. This deviation can be practically approximated as a Wiener-like process, thus resembling the phase noise of an equivalent local oscillator with a narrower linewidth. The rate of deviation becomes faster with decreasing $\tau$. Phase variations on time scales shorter than $\tau$ are not compensated by the method. Therefore, the choice of the time interval, $\tau$, across which the phase variations are measured must be traded off with minimizing the residual phase noise.

Figure 10:
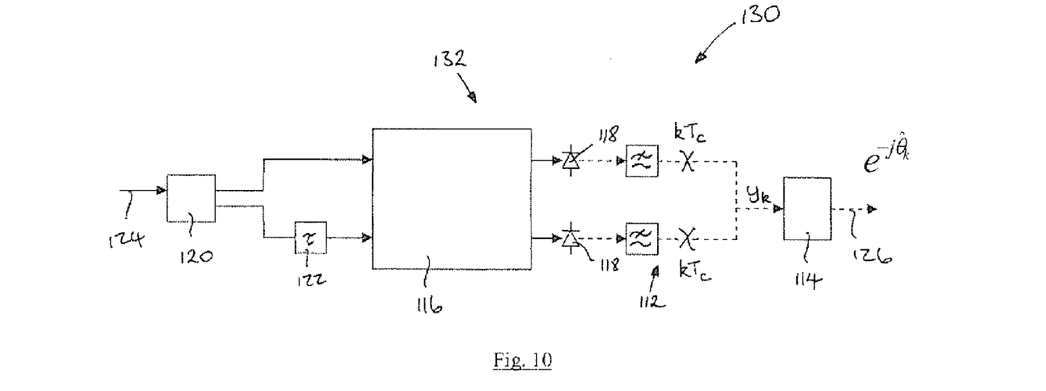
FIG. 10 is a schematic representation of phase noise estimation apparatus for use in a coherent optical receiver or an optical transmitter according to a tenth embodiment of the invention.

FIG. 10 shows phase noise estimation apparatus 130 for use with a coherent optical receiver 70 or an optical transmitter 90 according to a tenth embodiment of the invention, as shown in FIGS. 7 and 8. The phase noise estimation apparatus 130 of this embodiment is substantially the same as the phase noise estimation apparatus 80 of FIG. 9, with the following modifications. The same reference numbers are retained for corresponding features.

In this example, the balanced photodetectors are replaced by single photodetectors 118 in the phase measurement apparatus 132.

Figure 11:
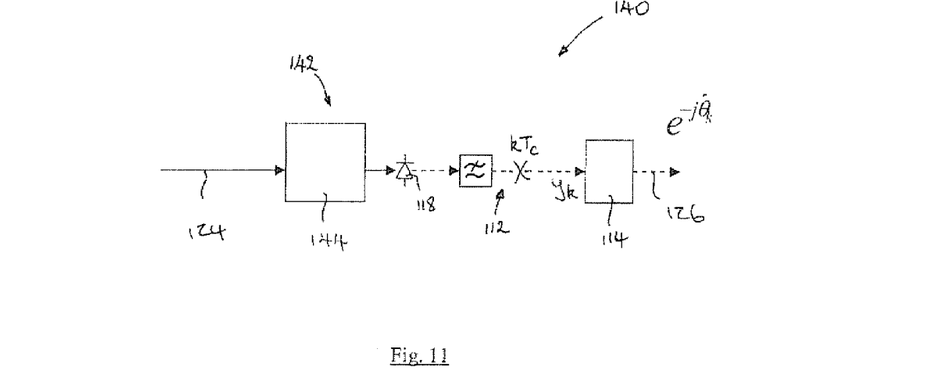
FIG. 11 is a schematic representation of phase noise estimation apparatus for use in a coherent optical receiver or an optical transmitter according to an eleventh embodiment of the invention.

FIG. 11 shows phase noise estimation apparatus 140 for use with a coherent optical receiver 70 or an optical transmitter 90 according to an eleventh embodiment of the invention, as shown in FIGS. 7 and 8. The phase noise estimation apparatus 140 is functionally equivalent to the phase noise estimation apparatus 80 of FIG. 9, with the following structural modifications. The same reference numbers are retained for corresponding features.

In this example, the phase measurement apparatus 142 comprises an optical filter 144 and a photodetector 118. The optical filter has a substantially linearly varying transfer function at the carrier frequency of the optical carrier 124. The transmission amplitude of the optical filter 114 decreases approximately linearly around the frequency of the optical carrier 124, such that the output current from the photodetector 118 is approximately proportional to the time derivative of the phase of the optical carrier 124.

Figure 12:
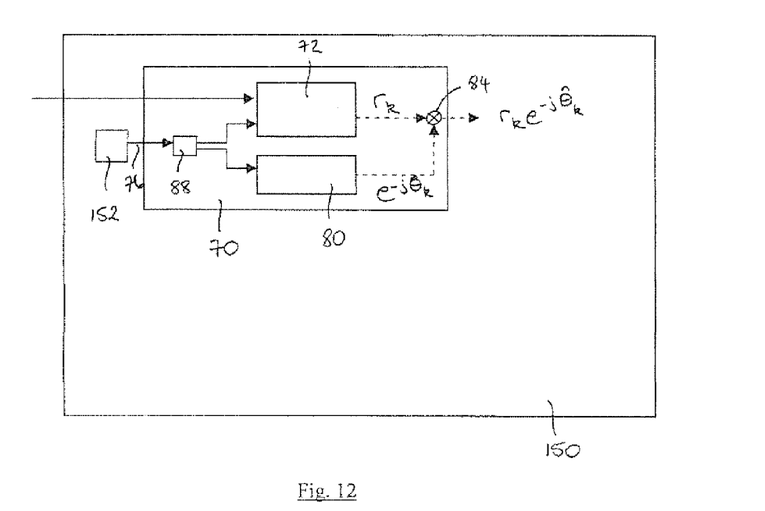
FIG. 12 is a schematic representation of an optical network element according to a twelfth embodiment of the invention.

An optical network element according to a twelfth embodiment of the invention is shown in FIG. 12. The optical network element 150 comprises a coherent optical receiver 70 as shown in FIG. 7 and a local oscillator 152 arranged to generate an optical carrier 76.

The optical communications network element 150 of this example is for use on the receive side of an optical communications network. It will be appreciated that the coherent optical receiver may be replaced by an optical transmitter 90, as shown in FIG. 8, for use on the transmit side of a communications network or the optical communications network element 150 may comprise both a coherent optical receiver 70 as shown in FIG. 7 and an optical transmitter 90 as shown in FIG. 8 to form an optical transceiver for use in an optical communications network.

Figure 13:
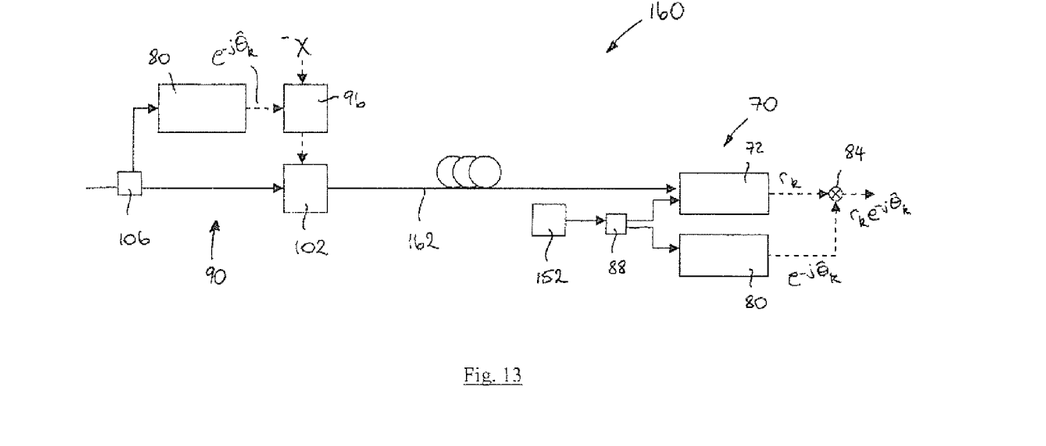
FIG. 13 is a schematic representation of an optical network according to a thirteenth embodiment of the invention.

Referring to FIG. 13, a thirteenth embodiment of the invention provides a coherent optical communications network 160 comprising an optical link 162, a coherent optical receiver 70 coupled to a receive end of the optical link 162 and an optical transmitter 90 coupled to the transmit end of the optical link 162.

The coherent optical receiver 70 is as shown in FIG. 7 and described above and the optical transmitter 90 is as shown in FIG. 8 and described above.

A fourteenth embodiment of the invention provides a data carrier having computer readable instructions embodied therein. The computer readable instructions are for providing access to resources available on a processor. The computer readable instructions comprise instructions to cause the processor to perform the method of compensating phase noise in a coherent optical communications network, as described above in relation to any of FIGS. 1 to 6.

The data carrier may comprise a memory device, such as an electronic memory device or a digital versatile disc, or may comprise a communications signal, such as for transmitting data across a communications network.

The invention claimed is:

1. A method of compensating phase noise in a coherent optical communications network, the method comprising:

receiving a traffic sample;

receiving an optical carrier and determining a phase noise estimate for the optical carrier by measuring phase variations of the optical carrier and integrating the measured phase variations; the estimate of the phase noise depending on a sampling time, $T_c$, the time interval, t, across which the phase variation is measured, and the measured phase variation; the estimate of the phase noise, $\hat{\theta}_k$, of the optical carrier at a time, k, being determined from $$\hat{\theta}_k = \hat{\theta}_{k-1} + \frac{T_c}{\tau} z'_k,$$

where $T_c$ is the sampling time, $z'_k = z_k - \bar{z}_k$, $z_k = \angle y_k$ is the phase of the sample $y_k$ and $\bar{z}_k$ the average value of $z_k$, $\hat{\theta}_{k-1}$ is an estimate of the phase noise at an earlier time, k−1, and $z'_k$ is substantially equal to the phase noise variation plus a Gaussian noise contribution added during measurement; and removing the phase noise estimate from the traffic sample to form a phase noise compensated traffic sample.

2. A method as claimed in claim 1, wherein the method comprises:
receiving a traffic carrying signal at a coherent optical receiver;
receiving a first optical carrier and power splitting the first optical carrier into a first part and a second part, and delivering the first part to the coherent optical receiver to generate a received traffic sample from the traffic carrying signal;
interrogating the second part of the first optical carrier to determine a phase noise estimate for the first optical signal; and
removing the phase noise estimate from the received traffic sample to form a phase noise compensated received traffic sample.

3. A method as claimed in claim 1, wherein the method comprises:
receiving a traffic sample to be transmitted;
receiving a second optical carrier and interrogating the second optical carrier to determine a phase noise estimate for the second optical carrier; and
removing the phase noise estimate from the traffic sample to be transmitted to form a phase noise compensated traffic sample for transmission on the second optical carrier.

4. A coherent optical receiver comprising:
a coherent optical detector arranged to receive a traffic carrying signal and to receive a first part of an optical carrier, and further arranged to generate a received traffic sample;
phase noise estimation apparatus arranged to receive a second part of the optical carrier and to generate an estimate of the phase noise of the optical carrier, the phase noise estimation apparatus comprising:
phase measurement apparatus arranged to generate a phase measurement signal;
sampling apparatus arranged to sample the phase measurement signal at a sampling time, $T_c$, to generate phase noise measurements; and
a phase noise estimator arranged to receive and integrate the phase noise measurements to generate a phase noise estimate which depends on the sampling time, $T_c$, a time interval, t, across which the phase variation is measured, and the measured phase variation, the phase noise estimator being arranged to generate a phase noise estimate, $\hat{\theta}_k$, of the optical carrier at a time, k, from $$\hat{\theta}_k = \hat{\theta}_{k-1} + \frac{T_c}{\tau} z'_k,$$

where $T_c$ is the sampling time, $z'_k = z_k - \bar{z}_k$, $z_k = \angle y_k$ is the phase of the sample $y_k$ and $\bar{z}_k$ the average value of $z_k$, $\hat{\theta}_{k-1}$ is an estimate of the phase noise at an earlier time, k−1, and $z'_k$ is substantially equal to the phase noise variation plus a Gaussian noise contribution added during measurement; and a mixer arranged to receive and mix the received traffic sample and the estimate of the phase noise to remove the phase noise estimate from the received traffic sample to form a phase noise compensated received traffic sample.

5. A coherent optical receiver as claimed in claim 4, wherein the phase measurement apparatus comprises one of: a 90 degree optical hybrid and first and second photodetectors; and an optical filter having a substantially linearly varying transfer function at a carrier frequency of the optical carrier and a photodetector.

6. A coherent optical communications network comprising:
an optical link; and
a coherent optical receiver coupled to a first end of the optical link, the coherent optical receiver comprising:
a coherent optical detector arranged to receive a traffic carrying signal and to receive a first part of an optical carrier, and further arranged to generate a received traffic sample;
phase noise estimation apparatus arranged to receive a second part of the optical carrier and to generate an estimate of the phase noise of the optical carrier, the phase noise estimation apparatus comprising:
phase measurement apparatus arranged to generate a phase measurement signal;
sampling apparatus arranged to sample the phase measurement signal at a sampling time $T_c$, to generate phase noise measurement; and
a phase noise estimator arranged to receive and integrate the phase noise measurements to generate a phase noise estimate which depends on the sampling time, $T_c$, a time interval, t, across which the phase variation is measured, and the measured phase variation, the phase noise estimator being arranged to generate a phase noise estimate, $\hat{\theta}_k$, of the optical carrier at a time, k, from $$\hat{\theta}_k = \hat{\theta}_{k-1} + \frac{T_c}{\tau} z'_k,$$

where $T_c$ is the sampling time, $z'_k = z_k - \bar{z}_k$, $z_k = \angle y_k$ is the phase of the sample $y_k$ and $\bar{z}_k$ the average value of $z_k$, $\hat{\theta}_{k-1}$ is an estimate of the phase noise at an earlier time, k−1, and $z'_k$ is substantially equal to the phase noise variation plus a Gaussian noise contribution added during measurement; and a mixer arranged to receive and mix the received traffic sample and the estimate of the phase noise to remove the phase noise estimate from the received traffic sample to form a phase noise compensated received traffic sample.

7. A coherent optical communications network as claimed in claim 6, wherein the network further comprises an optical transmitter coupled to a second end of the optical link, the optical transmitter comprising:
phase noise estimation apparatus arranged to receive a first part of an optical carrier and to generate an estimate of the phase noise of the optical carrier;
a mixer arranged to receive and mix a traffic sample to be transmitted and the estimate of the phase noise to remove the phase noise estimate from the traffic sample to form a phase noise compensated traffic sample for transmission; and
an optical modulator arranged to receive a second part of the optical carrier and the phase noise compensated traffic sample and further arranged to apply the phase noise compensated traffic sample to the second part of the optical carrier.

8. An optical transmitter comprising:
phase noise estimation apparatus arranged to receive a first part of an optical carrier and to generate an estimate of the phase noise of the optical carrier, the phase noise estimation apparatus comprising:
phase measurement apparatus arranged to generate a phase measurement signal;
sampling apparatus arranged to sample the phase measurement signal at a sampling time, $T_c$, to generate phase noise measurements; and
a phase noise estimator arranged to receive and integrate the phase noise measurements to generate a phase noise estimate which depends on the sampling time, $T_c$, a time interval, t, across which the phase variation is measured, and the measured phase variation, the phase noise estimator being arranged to generate a phase noise estimate, $\hat{\theta}_k$, of the optical carrier at a time, k, from $$\hat{\theta}_k = \hat{\theta}_{k-1} + \frac{T_c}{\tau} z'_k,$$

where $T_c$ is the sampling time $z'_k = z_k - \bar{z}_k$, $z_k = \angle y_k$ is the phase of the sample $y_k$ and $\bar{z}_k$ the average value of $z_k$, $\hat{\theta}_{k-1}$ is an estimate of the phase noise at an earlier time, k−1, $z'_k$ is substantially equal to the phase noise variation plus a Gaussian noise contribution added during measurement;
a mixer arranged to receive and mix a traffic sample to be transmitted and the estimate of the phase noise to remove the phase noise estimate from the traffic sample to form a phase noise compensated traffic sample for transmission; and
an optical modulator arranged to receive a second part of the optical carrier and the phase noise compensated traffic sample and further arranged to apply the phase noise compensated traffic sample to the second part of the optical carrier.

9. An optical transmitter as claimed in claim 8, wherein the phase measurement apparatus comprises one of: a 90 degree optical hybrid and first and second photodetectors; and an optical filter having a substantially linearly varying transfer function at a carrier frequency of the optical carrier and a photodetector.

* * * * *

UNITED STATES PATENT AND TRADEMARK OFFICE
CERTIFICATE OF CORRECTION

| | | |
|---|---|---|
| PATENT NO. | : 8,611,763 B2 | Page 1 of 1 |
| APPLICATION NO. | : 12/994402 | |
| DATED | : December 17, 2013 | |
| INVENTOR(S) | : Secondini et al. | |

It is certified that error appears in the above-identified patent and that said Letters Patent is hereby corrected as shown below:

In the specification

In Column 1, Line 24, delete "hit rates" and insert -- bit rates --, therefor.

In Column 2, Line 45, delete "to be to employed" and insert -- to be employed --, therefor.

In Column 4, Line 5, delete "the phase to" and insert -- the phase --, therefor.

Signed and Sealed this
Twenty-first Day of July, 2015

Michelle K. Lee
*Director of the United States Patent and Trademark Office*